US010906474B2

United States Patent
Chou et al.

(10) Patent No.: US 10,906,474 B2
(45) Date of Patent: Feb. 2, 2021

(54) INSTALLING BRACKET AND ELECTRONIC DEVICE ASSEMBLY

(71) Applicant: PEGATRON CORPORATION, Taipei (TW)

(72) Inventors: Yi-Ming Chou, Taipei (TW); Yaw-Song Chen, Taipei (TW); Shih-Wei Yeh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/352,649

(22) Filed: Mar. 13, 2019

(65) Prior Publication Data

US 2019/0291656 A1   Sep. 26, 2019

(30) Foreign Application Priority Data

Mar. 22, 2018   (TW) .............................. 107203688 U

(51) Int. Cl.
*B60R 11/00* (2006.01)
*B60R 11/02* (2006.01)

(52) U.S. Cl.
CPC ....... *B60R 11/0235* (2013.01); *B60R 11/0258* (2013.01); *B60R 2011/0017* (2013.01); *B60R 2011/0085* (2013.01)

(58) Field of Classification Search
CPC ............. B60R 11/0235; B60R 11/0258; B60R 2011/0017; B60R 2011/0085
USPC ........................................................ 224/275
See application file for complete search history.

(56) References Cited

U.S. PATENT DOCUMENTS

| 10,059,277 | B2 | 8/2018 | Ackeret et al. | |
|---|---|---|---|---|
| 2003/0025367 | A1* | 2/2003 | Boudinot | B60R 11/0235 297/217.3 |
| 2004/0032541 | A1* | 2/2004 | Rochel | B60R 11/0235 348/825 |
| 2008/0252798 | A1* | 10/2008 | Vitito | B60K 37/06 348/837 |
| 2009/0315368 | A1* | 12/2009 | Mitchell | B60R 11/02 297/188.04 |
| 2011/0155873 | A1* | 6/2011 | Montag | B60R 11/02 248/218.4 |
| 2017/0001575 | A1 | 1/2017 | Ackeret et al. | |

FOREIGN PATENT DOCUMENTS

| CN | 202986995 | 6/2013 |
|---|---|---|
| CN | 106163877 | 11/2016 |

* cited by examiner

*Primary Examiner* — Peter N Helvey
(74) *Attorney, Agent, or Firm* — J.C. Patents

(57) ABSTRACT

An installing bracket is configured to be assembled to head support rods of a vehicle seat for installing an electronic device. The installing bracket includes a first locking plate and a second locking plate. The first locking plate includes a first locking portion and a first joint portion having first concaves disposed on a first side of the first joint portion. The second locking plate includes a second locking portion and a second joint portion having second concaves disposed on a second side of the second joint portion. The first locking portion is stacked on the second locking portion and locked to each other. The electronic device is locked to the first locking portion and the second locking portion. The first concaves joint with the respective second concaves to define a plurality of assembly holes for the head support rods to penetrate through.

16 Claims, 7 Drawing Sheets

INSTALLING BRACKET AND ELECTRONIC DEVICE ASSEMBLY

CROSS-REFERENCE TO RELATED APPLICATION

This application claims the priority benefit of Taiwan application serial no. 107203688, filed on Mar. 22, 2018. The entirety of the above-mentioned patent application is hereby incorporated by reference herein and made a part of this specification.

BACKGROUND

Technology Field

The disclosure relates to an installing bracket and an electronic device assembly using the same.

Description of Related Art

In recent years, electronic products have been increasingly applied to vehicle systems, such as navigation systems, radar detection systems and rear seat entertainment (RSE) and the likes. In traffic jams or long-distance trips, except for the driver who must pay attention to road conditions and cannot be distracted, the passengers in the car are mostly likely to feel bored due to limited space inside the car. Therefore, multimedia device for vehicle has become the best choice for the passengers to spend time and enjoy entertainment.

Currently, electronic devices such as multimedia devices for vehicle that are mounted on a car seat are typically mounted on a headrest. Since there is no device designed exclusively for such installation, the steps of installing the electronic device on the headrest are cumbersome, and the firmness is also poor, which is more likely to affect the normal lifting of the seat headrest. Besides, such electronic devices for vehicles are often designed in the manner that a single installing device can only be configured for a specific model. The design for fixing each type of product must be tailored to individual model and cannot be applied to or shared on other models. In addition, to fulfill demands for different interior design of different models, two different kinds of designs for car seats are desired (with/without reserved space for rear seat entertainment). Moreover, the installation of electronic device will make the headrest look messy, occupying more space inside the vehicle, and having a greater influence on the interior layout and appearance of the vehicle body. Therefore, the application of current vehicle multimedia device is still very limited and causes great inconvenience.

SUMMARY

The disclosure provides an installing bracket for detachably installing an electronic device on a vehicle seat without affecting the appearance of the electronic device.

The disclosure provides an electronic device assembly that is configured to be detachably mounted to a vehicle seat and has a simple style.

An installing bracket of the disclosure is configured to be assembled to a plurality of head support rods of a vehicle seat for mounting an electronic device. The installing bracket includes a first locking plate and a second locking plate. The first locking plate includes a first locking portion and a first joint portion. The first joint portion includes a plurality of first concaves disposed on a first side of the first joint portion. The second locking plate includes a second locking portion and a second joint portion. The second joint portion includes a plurality of second concaves disposed on a second side of the second joint portion, and the first locking portion is stacked on the second locking portion and the first locking portion and the second locking portion are locked to each other. When the electronic device is mounted on the installing bracket, the electronic device is configured to be locked to the first locking portion and the second locking portion, and the first concaves joint with the respective second concaves to define a plurality of assembly holes for the head support rod to penetrate through.

In an embodiment of the disclosure, the first locking portion is protruded from the first side, the second locking portion is protruded from the second side, the first side joints with the second side, and the first locking portion overlaps with the second locking portion.

In an embodiment of the disclosure, the number of the first concaves is two, and the first locking portion is disposed between the two first concaves.

In an embodiment of the disclosure, the number of the second concaves is two, and the second locking portion is disposed between the two second concaves.

In an embodiment of the disclosure, the first locking portion includes at least one first device locking hole, and the second locking portion includes at least one second device locking hole. The electronic device is configured to be locked to the first locking portion and the second locking portion by using at least one locking component to penetrate through the at least one first device locking hole and the at least one second device locking hole.

In an embodiment of the disclosure, the first locking portion further includes at least one first seat locking hole, and the second locking portion further includes at least one second seat locking hole. The first locking portion and the second locking portion are locked to each other by using at least one locking component to penetrate through the at least one first seat locking hole and the at least one second seat locking hole.

In an embodiment of the disclosure, the first locking portion further includes at least one positioning hole, and the electronic device further includes at least one positioning column penetrating through the at least one positioning hole and being positioned on the first locking plate.

In an embodiment of the disclosure, the electronic device includes a device body and a fixing bracket. The device body is pivotally connected to the fixing bracket and rotates relative to the fixing bracket, and the fixing bracket is locked to the first locking portion and the second locking portion.

In an embodiment of the disclosure, the device body includes a display.

An electronic device assembly of the disclosure is configured to be assembled to a plurality of head support rods of a vehicle seat. The electronic device assembly includes the installing bracket described above and an electronic device. The electronic device includes a device body and a fixing bracket. The device body is pivotally connected to the fixing bracket and rotates relative to the fixing bracket, and the fixing bracket is locked to the first locking portion and the second locking portion that overlap with each other.

Based on the above, the installing bracket in the embodiment of the disclosure employs two locking plates locking to each other to jointly define a plurality of assembly holes for the head support rod of the headrest structure of the vehicle seat to penetrate through, such that the electronic device is configured to be locked to the locking holes of the two locking plates through the locking component. With such structural configuration, the installing bracket in the embodiment of the disclosure can be applied to various vehicle models through simple assembling method while having a slim and compact profile and appearance, thereby greatly improving the application of the electronic device assembly, and the vehicle seat has a simple and clean appearance.

In order to make the aforementioned features and advantages of the disclosure more comprehensible, embodiments accompanying figures are described in detail below.

DETAILED DESCRIPTION

The above and other technical contents, features and effects of the present disclosure will be clear from the below detailed description of an embodiment of the present disclosure with reference to accompanying drawings. The directional terms mentioned in the embodiments below, like "above", "below", "front", "back", "left" and "right" refer to the directions in the appended drawings. Therefore, the directional terms are only used for illustration instead of limiting the present disclosure. Meanwhile, in the following embodiments, like components will be identified by like numerals.

Figure 1:
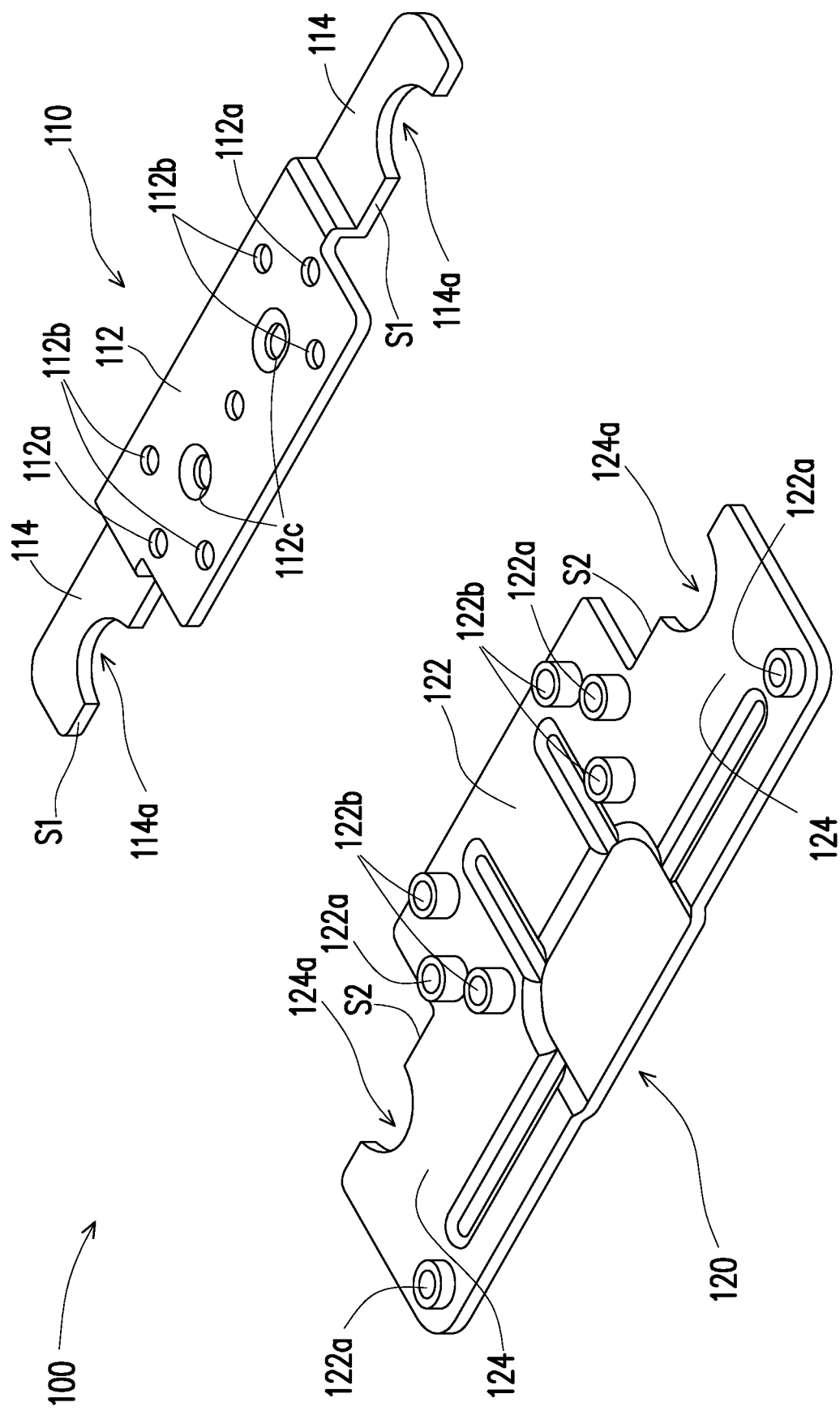
FIG. 1 is a schematic exploded view of an installing bracket according to an embodiment of the disclosure.
Figure 2:
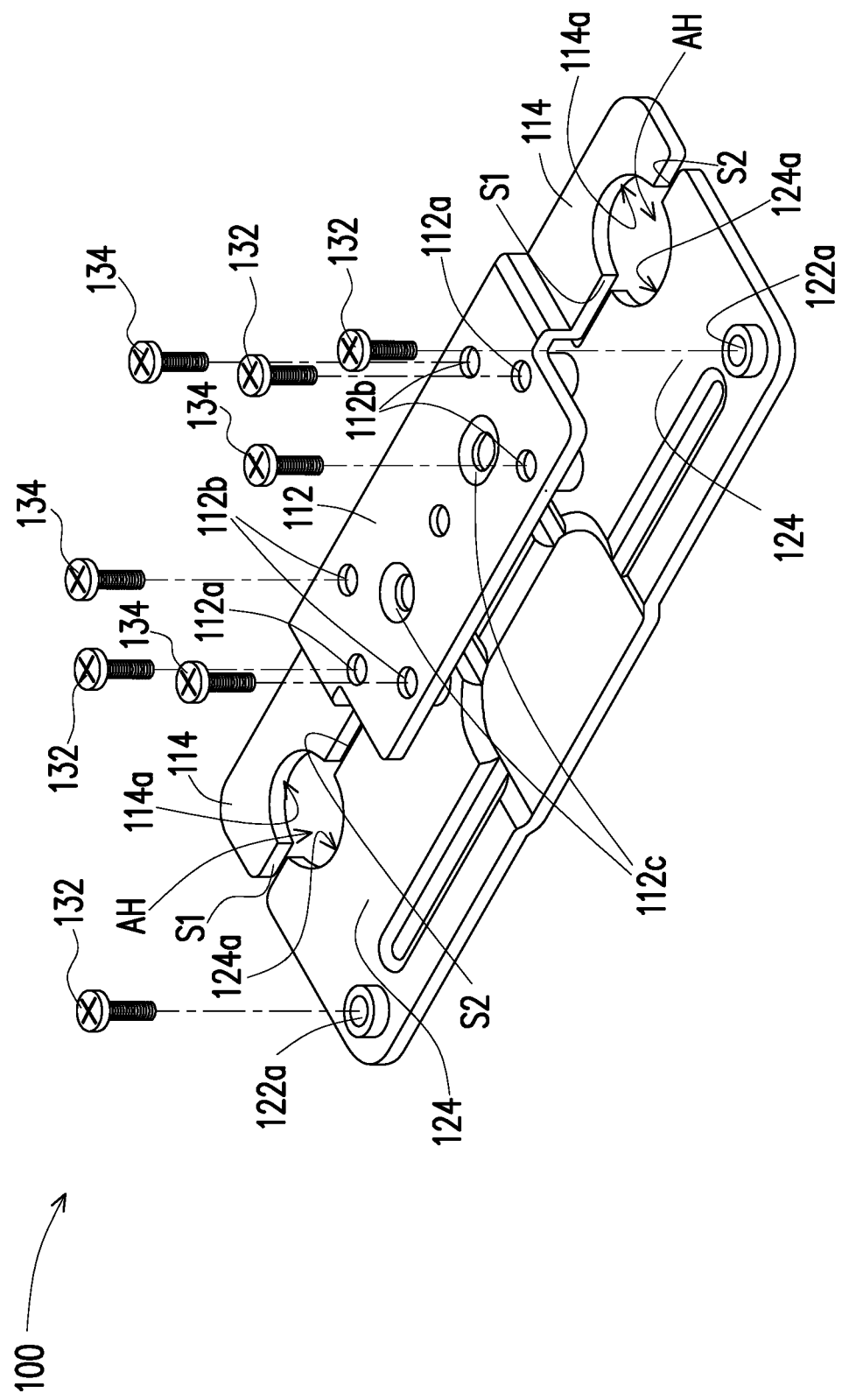
FIG. 2 is a schematic view illustrating assembling an installing bracket according to an embodiment of the disclosure.
Figure 6:
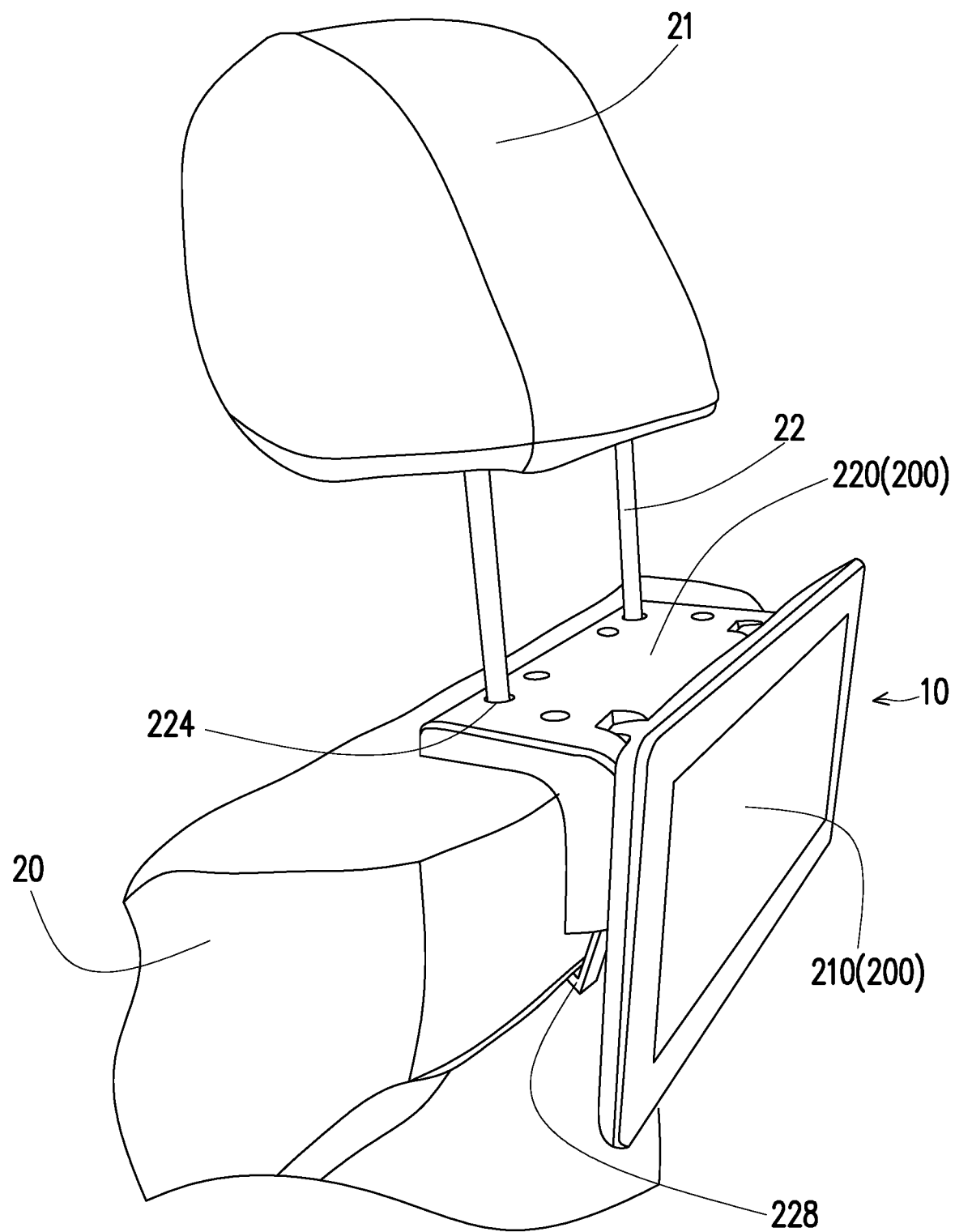

Referring to FIG. 1, FIG. 2 and FIG. 6, an installing bracket 100 of the embodiment is configured to be assembled to a plurality of head support rods 22 of a vehicle seat 20 for mounting an electronic device 200. In the exemplary embodiment, the electronic device 200 may be a multimedia device for vehicle, which may include a display. The installing bracket 100 may be assembled to the vehicle seat 20 for ease of installing the electronic device 200 on, for example, a rear surface of the vehicle seat 20, so that the passengers at the rear seat can operate the electronic device 200 or view the information displayed on the display of the electronic device 200. Of course, the exemplary embodiment is for illustrative purposes only, and the disclosure provides no limitation to the types of electronic devices.

In the exemplary embodiment, the installing bracket 100 may include a first locking plate 110 and a second locking plate 120 as shown in FIG. 1. The first locking plate 110 includes a first locking portion 112 and a first joint portion 114, wherein the first joint portion 114 includes a plurality of first concaves 114a (illustrated as two, but not limited thereto). In the exemplary embodiment, the first concaves 114a are disposed on a first side S1 of the first joint portion 114, and the first locking portion 112 is protruded from the first side S1. Similarly, the second locking plate 120 correspondingly includes a second locking portion 122 and a second joint portion 124. The second joint portion 124 includes a plurality of second concaves 124a (illustrated as two, but not limited thereto). In the exemplary embodiment, the second concaves 124a are disposed on a second side S2 of the second joint portion 124 and the positions of the second concaves 124a correspond to those of the first concaves 114a, and the second locking portion 122 is protruded from the second side S2. With such configuration, when the first locking plate 110 is assembled to the second locking plate 120 in the direction that the first side S1 thereof faces the second side S2 of the second locking plate 120, the first locking portion 112 is stacked on the second locking portion 122 as shown in FIG. 2, and the first locking portion 112 and the second locking portion 122 may be locked to each other through a plurality of locking components 134 to fix relative position between the first locking plate 110 and the second locking plate 120, and the first locking plate 110 and the second locking plate 120 are locked to the vehicle seat 20 as shown in FIG. 6. That is, when the first locking plate 110 is locked to the second locking plate 120, the first side S1 of the first joint portion 114 joints with the second side S2 of the second joint portion 124, and the first locking portion 112 and the second locking portion 122 overlap with each other.

For example, the first locking portion 112 may include at least one first seat locking hole 112b (illustrated as four, but not limited thereto), and the second locking portion 122 may include at least one second seat locking hole 122b (illustrated as four, but not limited thereto). The first seat locking holes 112b and the second seat locking holes 122b may be aligned with each other. Thus, at least one locking component 134 (illustrated as four, but not limited thereto) may penetrate through the corresponding first seat locking holes 112b and the second seat locking holes 122b to lock the first locking plate 110 and the second locking plate 120 together. It should be noted that the embodiment is merely for illustration, and the disclosure provides no limitation to the number and configuration positions of the first seat locking holes 112b and the second seat locking holes 122b, it will suffice the purpose as long as the numbers and configuration positions of the first seat locking holes 112b and the second seat locking holes 122b correspond to each other.

Further, the vehicle seat 20 may also have at least one locking hole (not shown) corresponding to the first seat locking holes 112b and the second seat locking holes 122b. Thus, the locking components 134 may penetrate through the first seat locking holes 112b and the second seat locking holes 122b and are locked in the locking holes of the vehicle seat 20, thereby locking the first locking plate 110 and the second locking plate 120 to the vehicle seat 20 as shown in FIG. 6. The number and configuration position of the locking holes of the vehicle seat 20 may correspond to the first seat locking holes 112b and the second seat locking holes 122b.

In the exemplary embodiment, the first concaves 114a may joint with the respective second concaves 124a to define a plurality of assembly holes AH together for the head support rod 22 as shown in FIG. 6 to penetrate through, such that the first locking plate 110 and the second locking plate 120 are fixed to the vehicle seat 20. In the exemplary embodiment, the shape of the first concaves 114a and the second concaves 124a may be, for example, a semicircular shape, so that the circular assembly holes AH can be defined by the first concaves 114a and the second concaves 124a together when they joint with each other. Of course, the shape of the first concaves 114a and the second concaves 124a may be modified as needed according to the actual needs of the assembly holes AH.

Figure 3:
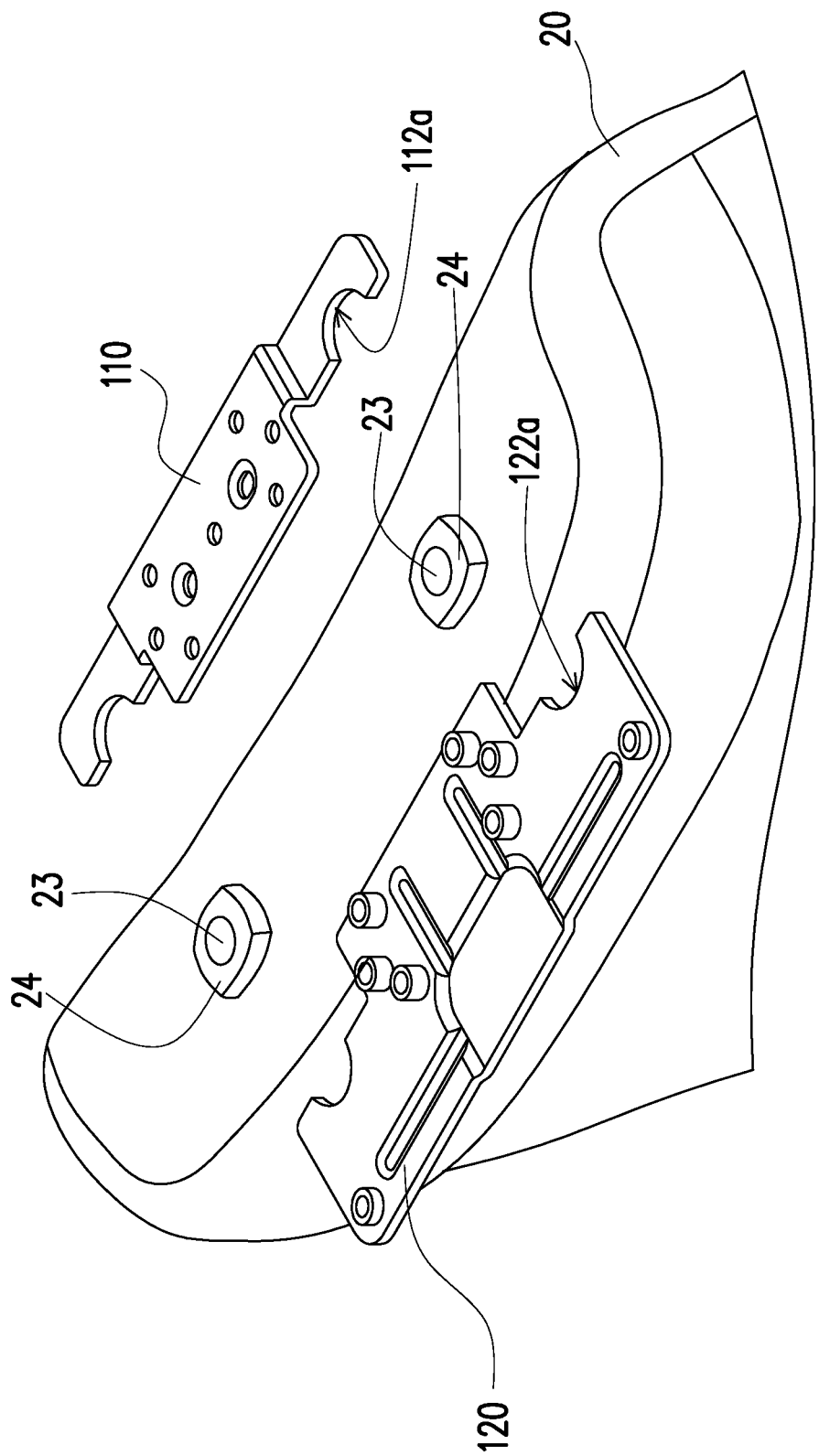
FIG. 3 to FIG. 7 are schematic views illustrating the assembling process of components of an electronic device assembly according to an embodiment of the disclosure.

Referring to FIG. 1 to FIG. 3, in some embodiments, the vehicle seat 20 may include a plurality of yielding holes 23 and a plurality of positioning pads 24 disposed on the yielding holes 23 as shown in FIG. 3. In this manner, the plurality of head support rods 22 of the headrest structure 21 may be inserted into the corresponding yielding holes 23 and fixed by the positioning pads 24. In general, the number of the head support rod 22 for fixing in the headrest structure 21 of the vehicle seat 20 is two, and therefore, in the exemplary embodiment, the numbers of the first concaves 114a and the second concaves 124a may both be two to correspond to the number of the head support rod 22 to define two assembly holes AH together. Of course, the numbers of the first concaves 114a and the second concaves 124a may be adjusted as needed according to the number of the head support rod 22. In the exemplary embodiment, the first locking plate 110 and the second locking plate 120 may be locked to each other between the positioning pad 24 and the upper surface of the vehicle seat 20. With such configuration, the first locking portion 112 may be disposed between the two first concaves 114a, that is, the first locking portion 112 may be located in the middle of the first joint portion 114 having the first concaves 114a and protruded from the first side S1 of the first joint portion 114. Similarly, the second locking portion 112 may be disposed between the two second concaves 124a, that is, the second locking portion 122 may be located in the middle of the second joint portion 124 having the second concaves 124a and protruded from the second side S2 of the two joint portion 124.

Figure 4:
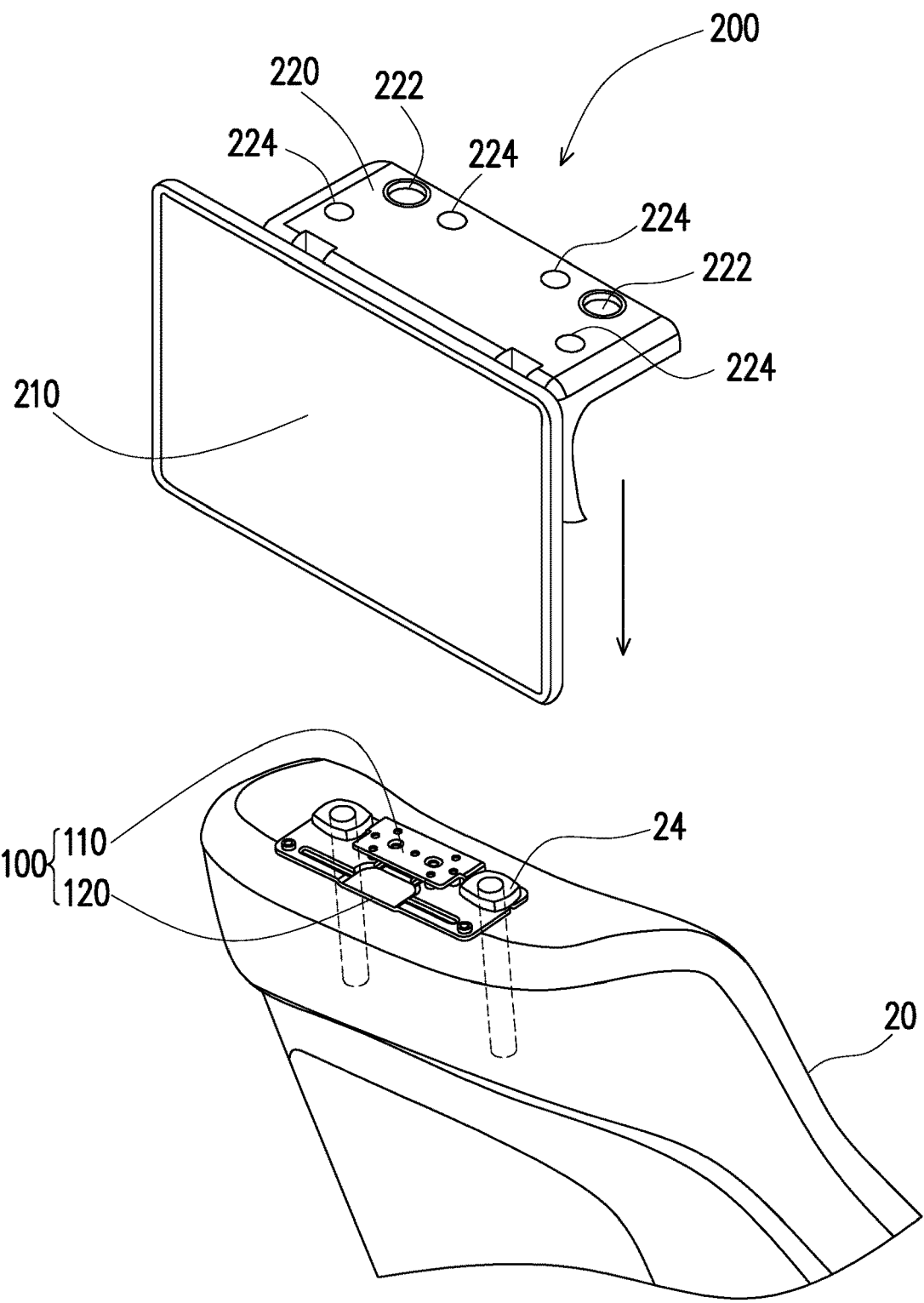

Referring to FIG. 4, after the first locking plate 110 and the second locking plate 120 are locked to the vehicle seat 20, the electronic device 200 may be locked to the first locking portion 112 and the second locking portion 122 as shown in FIG. 4. In the exemplary embodiment, the electronic device 200 may be a multimedia device for vehicle, which may include a device body 210 and a fixing bracket 220. The device body 210 may include a display, and the device body 210 may be pivotally connected to the fixing bracket 220 and rotates relative to the fixing bracket 220. The electronic device 200 may be locked to the first locking portion 112 and the second locking portion 122 through the fixing bracket 220. In the exemplary embodiment, the fixing bracket 220 may include a plurality of yielding holes 222 for the head support rods 22 as shown in FIG. 6 to penetrate through, thereby fixing the electronic device 200 to the vehicle seat 20.

Figure 5:
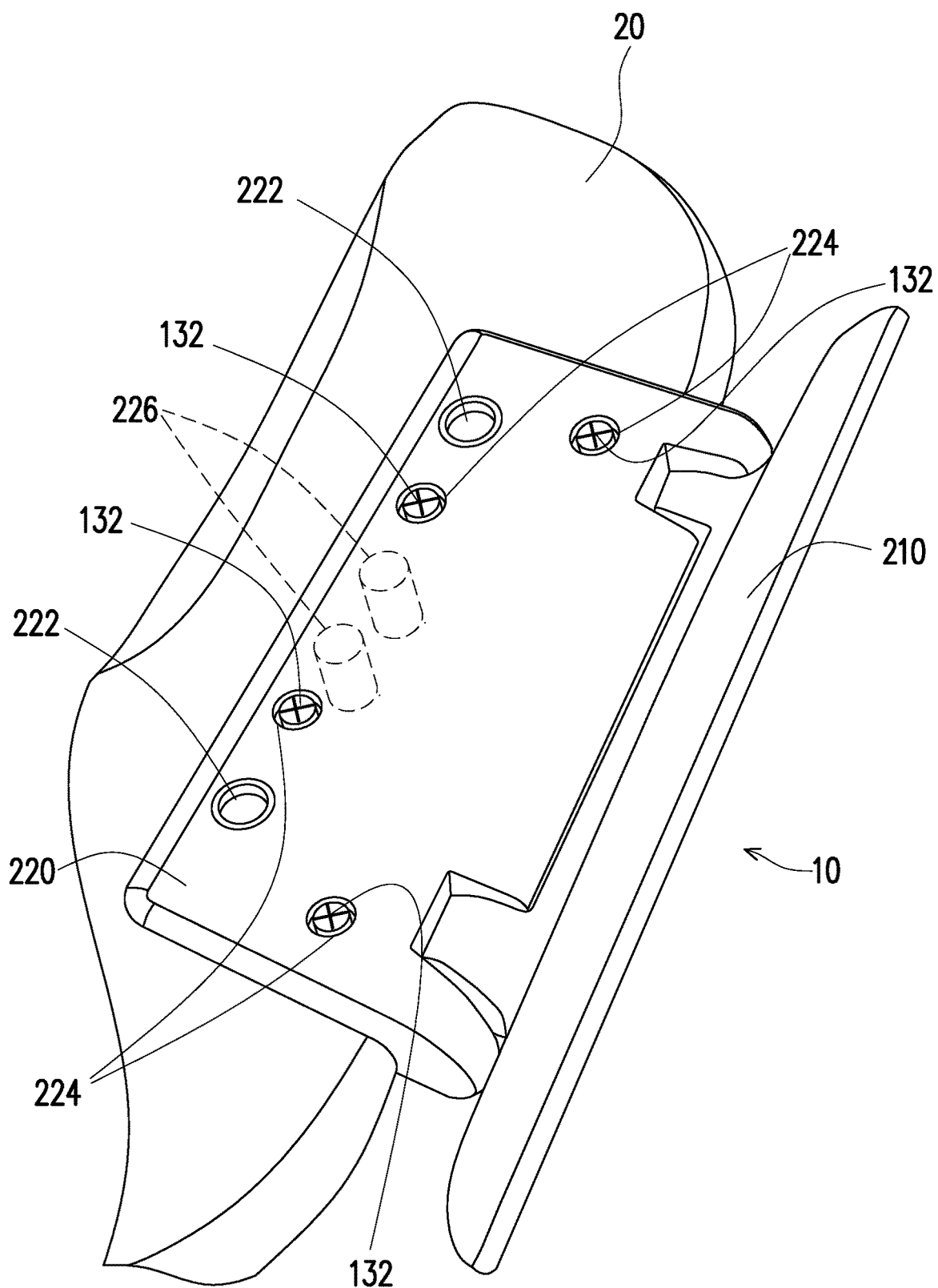

For example, referring to FIG. 1, FIG. 4 and FIG. 5, the first locking portion 112 may include at least one first device locking hole 112a (illustrated as two, but not limited thereto), and the second locking portion 122 may include at least one second device locking hole 122a (illustrated as four, but not limited thereto). In this manner, the fixing bracket 220 of the electronic device 200 may further include at least one locking hole 224 (illustrated as four, but not limited thereto). With this configuration, at least one locking component 132 (illustrated as four, but not limited thereto) may penetrate through the locking holes 224 of the electronic device 200 and the first device locking holes 112a and the second device locking holes 122a of the installing bracket 100, such that the electronic device 200 is locked to the first locking portion 112 and the second locking portion 122 of the installing bracket 100.

In the exemplary embodiment, two of the second device locking holes 122a may correspond to the two first device locking holes 112a on the first locking portion 112. Thus, two of the locking components 132 may individually penetrate through the two locking holes 224 of the electronic device 200 and the first device locking holes 112a and the corresponding second device locking holes 122a thereof. Meanwhile, the other two of the locking components 132 may individually penetrate through the other two locking holes 224 of the electronic device 200 and the other two second device locking holes 122a of the second locking portion 122, such that the electronic device 200 can be further fixed to the installing bracket 100. That is, the numbers of the first device locking holes 112a and the second device locking holes 122a may be different. Of course, in other embodiments, the numbers of the first device locking holes 112a and the second device locking holes 122a may also be the same and correspond to each other. In the exemplary embodiment, the locking components 132, 134 may be, for example, screws, and the locking holes 112a, 112b, 122a, 122b may be corresponding screw holes.

In addition, in the exemplary embodiment, the first locking portion 112 may further include at least one positioning hole 112c (illustrated as two, but not limited thereto) as shown in FIG. 2, and the fixing bracket 220 of the electronic device 200 may further include at least one positioning column 226 as shown in FIG. 5, which may be protruded from the lower surface of the fixing bracket 220 facing the first locking portion 112 to penetrate through the positioning holes 112c of the first locking portion 112, thereby further positioning the electronic device 200 on the first locking plate 110. At this stage, the electronic device assembly 10 including the installing bracket 100 and the electronic device 200 is substantially completely assembled. With such structural configuration, the installing bracket 100 in the embodiment can be applied to various vehicle models through simple assembling method while having a thin thickness and compact style, thereby greatly improving the application of the electronic device assembly 10.

Figure 7:
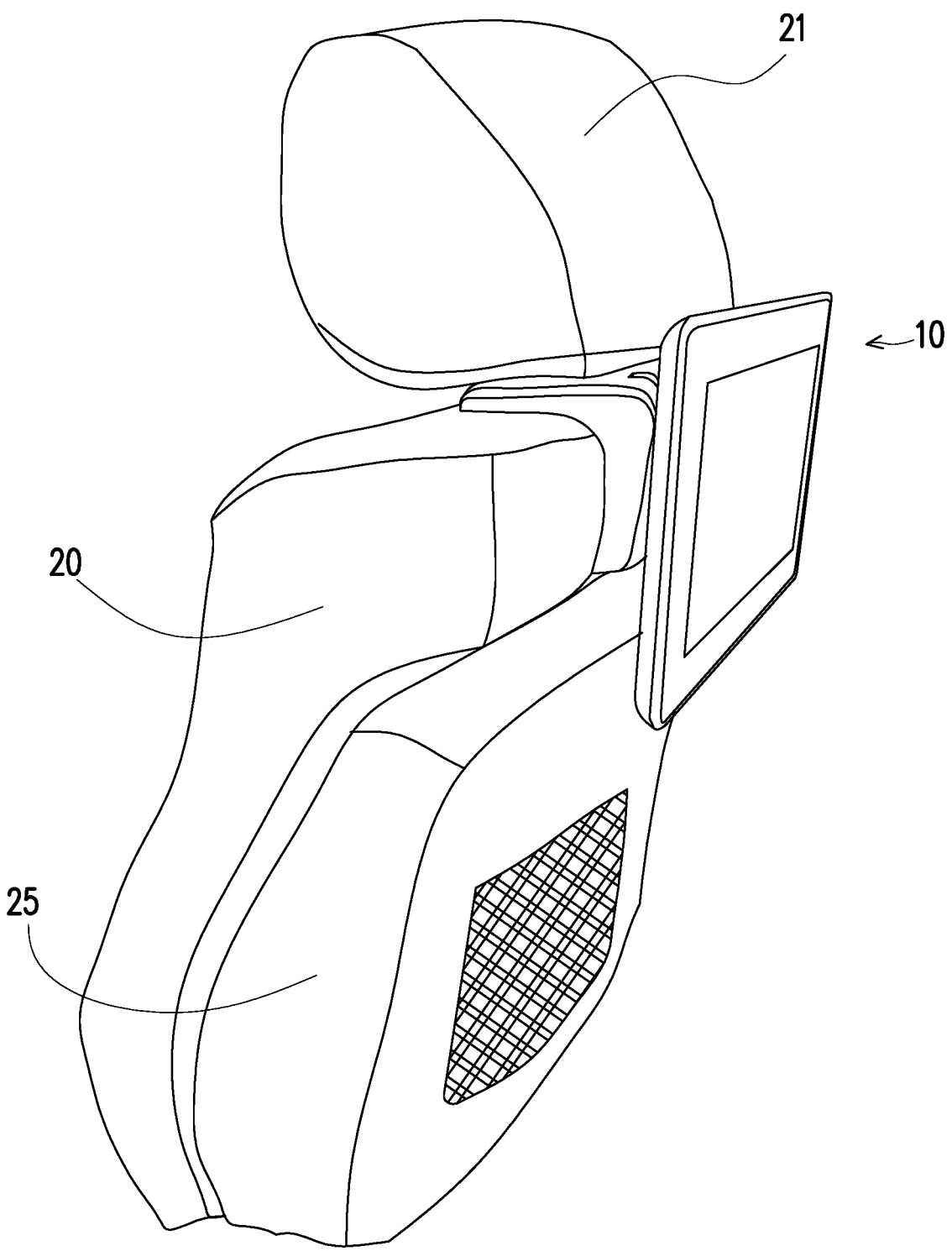

Referring to FIG. 6 and FIG. 7, after the electronic device 200 is locked to the installing bracket 100, the head support rod 22 of the headrest structure 21 may be inserted into the yielding holes 23 of the vehicle seat 20, and thus the fixing bracket 220 of the electronic device 200 and the installing bracket 100 may be interposed between the headrest structure 21 and the vehicle seat 20. Moreover, in such configuration, the installing bracket 100 is hidden under the fixing bracket 220 of the electronic device 200 without being exposed, so that the vehicle seat 20 can have a relatively simple and clean appearance. In the exemplary embodiment, the fixing bracket 220 of the electronic device 200 may further include a hook 228 that can structurally interfere with an engaging structure on the rear surface of the vehicle seat 20 to further secure the electronic device 200. The engaging structure herein may be any protruding structure on the rear surface of the vehicle seat 20, or may be an engaging structure specifically designed. Thereafter, a back plate 25 of the vehicle seat 20 is assembled to the rear surface of the vehicle seat 20 to hide the hook 228 therein, so that the vehicle seat 20 can have a simple and clean appearance.

In summary, the installing bracket in the embodiment of the disclosure employs two locking plates to lock each other to jointly define a plurality of assembly holes for the head support rod of the headrest structure of the vehicle seat to penetrate through, such that the electronic device is locked to the locking holes of the two locking plates through the locking component. With such structural configuration, the installing bracket in the embodiment of the disclosure can be applied to various vehicle models through simple assembling method while having a slim and compact profile and appearance, thereby greatly improving the application of the electronic device assembly. Moreover, the installing bracket may be hidden under the fixing bracket of the electronic device, so that the vehicle seat has a simple and clean appearance.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electronic device assembly, configured to be assembled to a plurality of head support rods of a vehicle seat, comprising:
   an installing bracket comprising:
      a first locking plate, comprising at least one first device locking hole, a first locking portion and a first joint portion, the first joint portion comprising a plurality of first concaves disposed on a first side of the first joint portions; and
      a second locking plate, comprising at least one second device locking hole, a second locking portion and a second joint portion, the second joint portion comprising a plurality of second concaves disposed on a second side of the second joint portion, and positions of the second concaves corresponding to the first concaves, the first locking portion stacked on the second locking portion, and the first locking portion and the second locking portion locked to each other, wherein when an electronic device is mounted on the installing bracket, the electronic device is configured to be locked to the first locking portion and the second locking portion by using at least one locking component to penetrate through the at least one first device locking hole and the at least one second device locking hole, and the first concaves joint with the respective second concaves to define a plurality of assembly holes together for the head support rods to penetrate through; and
   the electronic device, comprising a device body and a fixing bracket, the device body pivotally connected to the fixing bracket and rotates relative to the fixing bracket, and the fixing bracket locked to the first locking portion and the second locking portion overlapping with each other.

2. The electronic device assembly according to claim 1, wherein the first locking portion is protruded from the first side, the second locking portion is protruded from the second side, the first side joints with the second side, and the first locking portion and the second locking portion overlap with each other.

3. The electronic device assembly according to claim 1, wherein the number of the first concaves is two, and the first locking portion is disposed between the two first concaves.

4. The electronic device assembly according to claim 1, wherein the number of the second concaves is two, and the second locking portion is disposed between the two second concaves.

5. The electronic device assembly according to claim 1, wherein the first locking portion further comprises at least one first seat locking hole, the second locking portion further comprises at least one second seat locking hole, the first locking portion and the second locking portion are locked to each other by using at least one locking component to penetrate through the at least one first seat locking hole and the at least one second seat locking hole.

6. The electronic device assembly according to claim 1, wherein the first locking portion further comprises at least one positioning hole, the electronic device further comprises at least one positioning column penetrating through the at least one positioning hole and being positioned on the first locking plate.

7. The electronic device assembly according to claim 1, wherein the electronic device comprises a device body and a fixing bracket, the device body is pivotally connected to the fixing bracket and rotates relative to the fixing bracket, and the fixing bracket is locked to the first locking portion and the second locking portion.

8. The electronic device assembly according to claim 7, wherein the device body comprises a display.

9. An installing bracket assembly, configured to be assembled to a plurality of head support rods of a vehicle seat to mount an electronic device, the installing bracket comprising:
   a first locking plate, comprising at least one first device locking hole, a first locking portion and a first joint portion, the first joint portion comprising a plurality of first concaves disposed on a first side of the first joint portions; and
   a second locking plate, comprising at least one second device locking hole, a second locking portion and a second joint portion, the second joint portion comprising a plurality of second concaves disposed on a second side of the second joint portion, and positions of the second concaves corresponding to the first concaves, the first locking portion stacked on the second locking portion, and the first locking portion and the second locking portion locked to each other, wherein when the electronic device is mounted on the installing bracket, the electronic device is configured to be locked to the first locking portion and the second locking portion by using at least one locking component to penetrate through the at least one first device locking hole and the at least one second device locking hole, and the first concaves joint with the respective second concaves to define a plurality of assembly holes together for the head support rods to penetrate through.

10. The installing bracket according to claim 9, wherein the first locking portion is protruded from the first side, the second locking portion is protruded from the second side, the first side joints with the second side, and the first locking portion and the second locking portion overlap with each other.

11. The installing bracket according to claim 9, wherein the number of the first concaves is two, and the first locking portion is disposed between the two first concaves.

12. The installing bracket according to claim 9, wherein the number of the second concaves is two, and the second locking portion is disposed between the two second concaves.

13. The installing bracket according to claim 9, wherein the first locking portion further comprises at least one first seat locking hole, the second locking portion further comprises at least one second seat locking hole, the first locking portion and the second locking portion are locked to each other by using at least one locking component to penetrate through the at least one first seat locking hole and the at least one second seat locking hole.

14. The installing bracket according to claim 9, wherein the first locking portion further comprises at least one positioning hole, the electronic device further comprises at least one positioning column penetrating through the at least one positioning hole and being positioned on the first locking plate.

15. The installing bracket according to claim 9, wherein the electronic device comprises a device body and a fixing bracket, the device body is pivotally connected to the fixing bracket and rotates relative to the fixing bracket, and the fixing bracket is locked to the first locking portion and the second locking portion.

16. The installing bracket according to claim 15, wherein the device body comprises a display.

* * * * *